United States Patent
Lee et al.

(10) Patent No.: US 9,275,494 B2
(45) Date of Patent: Mar. 1, 2016

(54) METHOD AND APPARATUS FOR STACK MANAGEMENT

(71) Applicants: SAMSUNG ELECTRONICS CO., LTD., Suwon-si (KR); INDUSTRY-ACADEMIC COOPERATION FOUNDATION, YONSEI UNIVERSITY, Seoul (KR)

(72) Inventors: Won Jong Lee, Seoul (KR); Jin Woo Kim, Seoul (KR); Young Sam Shin, Hwaseong-si (KR); Jae Don Lee, Yongin-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 227 days.

(21) Appl. No.: 13/958,850

(22) Filed: Aug. 5, 2013

(65) Prior Publication Data
US 2014/0244693 A1  Aug. 28, 2014

(30) Foreign Application Priority Data

Feb. 25, 2013  (KR) ......................... 10-2013-0019698

(51) Int. Cl.
*G06F 17/30*  (2006.01)
*G06T 15/06*  (2011.01)

(52) U.S. Cl.
CPC ............. *G06T 15/06* (2013.01); *G06T 2200/28* (2013.01)

(58) Field of Classification Search
USPC .................................................. 707/791, 797
See application file for complete search history.

(56) References Cited

U.S. PATENT DOCUMENTS

| 6,122,645 | A  | * | 9/2000  | Bohannon  | G06F 17/30309 |
| 8,289,324 | B1 | * | 10/2012 | Laine     | G06T 15/06 345/426 |
| 2009/0153556 | A1 |   | 6/2009  | Nam et al. | |
| 2009/0189898 | A1 | * | 7/2009  | Dammertz  | G06T 15/06 345/426 |
| 2011/0016153 | A1 | * | 1/2011  | Atta      | G06F 17/30589 707/797 |
| 2011/0225038 | A1 | * | 9/2011  | Fontoura  | G06F 17/30501 705/14.49 |
| 2011/0283059 | A1 | * | 11/2011 | Govindarajan | G06T 15/06 711/104 |
| 2012/0185511 | A1 | * | 7/2012  | Mansfield | G06F 17/218 707/792 |
| 2012/0209862 | A1 | * | 8/2012  | Hernandez | H04L 69/22 707/755 |
| 2012/0246204 | A1 | * | 9/2012  | Nalla     | G06F 12/0253 707/815 |
| 2012/0313944 | A1 | * | 12/2012 | Kontkanen | G06T 1/60 345/426 |

FOREIGN PATENT DOCUMENTS

| KR | 10-2008-0020198 | 3/2008 |
| KR | 10-2008-0055327 | 6/2008 |
| KR | 10-2012-0033585 | 4/2012 |

OTHER PUBLICATIONS

Kristof Römisch et al., "Sparse Voxel Octree Ray Tracing on the GPU", Master's Thesis, Department of Computer Science, Aarhus Univerity Denmark, Sep. 2009, 91 pages.

(Continued)

*Primary Examiner* — Kim Nguyen
(74) *Attorney, Agent, or Firm* — NSIP Law

(57) ABSTRACT

A method and apparatus for managing a stack used for a tree traversal (TRV) may include a processing unit that may manage a short stack for a tree TRV, and a storage unit that may store data of the short stack. The processing unit may perform a restart of the tree TRV from an intermediate node of a tree to fill the short stack when the short stack is empty.

16 Claims, 27 Drawing Sheets

(56) References Cited

OTHER PUBLICATIONS

Daniel Reiter Horn et al., "Interactive k-D Tree GPU Raytracing", I3D '07 Proceedings of the 2007 Symposium on Interactive 3D Graphics and Games, 2007, 8 pages.

Samuli Laine et al., "Restart Trail for Stackless BVH Traversal", High Performance Graphics, 2010, 5 pages.

Vlastimil Havran et al., "Stackless Ray Traversal for kD-Trees with Sparse Boxes", Czech Technical University, Nov. 2007, pp. 1-15.

* cited by examiner

METHOD AND APPARATUS FOR STACK MANAGEMENT

CROSS-REFERENCE TO RELATED APPLICATIONS

This application claims the priority benefit of Korean Patent Application No. 10-2013-0019698, filed on Feb. 25, 2013, in the Korean Intellectual Property Office, the disclosure of which is incorporated herein by reference.

BACKGROUND

1. Field

The following description relates to a method and apparatus for managing a stack, and more particularly, to a method and apparatus for managing a stack used for a tree traversal (TRV).

2. Description of the Related Art

Three dimensional (3D) rendering may refer to an image processing procedure that synthesizes data of a 3D object into an image visible from a view point of a camera provided.

A rendering scheme may include a rasterization scheme and a ray tracing scheme. The rasterization scheme may generate an image by projecting a 3D object onto a screen. The ray tracing scheme may generate an image by tracing a path of incident light along a ray transmitted toward a respective pixel of the image from the view point of the camera.

The ray tracing scheme may be advantageous in that a high quality image may be generated based on a physical property of light, such as reflection, refraction, transmission, and the like. However, the ray tracing scheme may face a difficulty in processing rendering at a high speed because a substantial amount of calculation is used for the ray tracing.

One factor used to determine a performance of the ray tracing may include a traversal (TRV) of an acceleration structure (AS) and an intersection test (IST) between ray-primitives. The TRV of the AS and the IST between the ray-primitives may be performed tens of times with respect to a plurality of rays.

The AS may be a partitioning AS. The AS may be a data structure in which scene objects to be rendered are represented through being partitioned spatially. A material structure, such as a grid, a k-dimensional (k-d) tree, a bounding volume hierarchy (BVH), and the like, may be used as the AS.

Processing the ray tracing with respect to a signal ray may not be dependent on processing the ray tracing with respect to another ray. Accordingly, ray traversing hardware of a multiple instruction multiple data (MIMD) architecture may process multiple ray TRVs in parallel. When a ray TRV is processed by an acceleration of hardware, a pipeline architecture and a multi-core structure may enhance a performance of the ray TRV.

When a number of rays being processed simultaneously increases, a number of registers to be maintained for the ray tracing may increase. Also, a storage space for managing a stack used for the ray tracing may occupy a large portion of storage space in the ray traversing hardware.

SUMMARY

The foregoing and/or other aspects are achieved by providing an electronic apparatus, including a processing unit to manage a short stack for a tree traversal (TRV), and a storage unit to store data of the short stack, wherein the processing unit restarts the tree TRV from an intermediate node disposed between a root node of the tree and a node popped last in the short stack to fill the short stack when the short stack is empty.

The tree may be an acceleration structure (AS) in which partitioned spaces overlap.

The tree may be a bounding volume hierarchy (BVH).

The processing unit may predetermine the intermediate node by storing a link indicating the intermediate node in the storage unit.

The processing unit may store the link in the storage unit when the short stack is full.

The processing unit may manage a buffer of a fixed size, the storage unit stores data of the buffer, and the buffer stores the short stack, and stores the link indicating the intermediate node.

The link may include a plurality of links.

The processing unit may variably adjust a size of a first area in the buffer storing the short stack and a size of a second area in the buffer storing the plurality of links.

The processing unit may determine a number of the plurality of links, based on a maximum value of a number of nodes being pushed during the tree TRV.

The processing unit may determine a number of the plurality of links, based on the maximum value of the number of nodes being pushed during the tree TRV, and a size of the short stack.

The foregoing and/or other aspects are achieved by providing a method for a tree TRV, by an electronic apparatus, using a short stack, the method including popping a node from the short stack, and restarting the tree TRV to fill the short stack from an intermediate node disposed between a root node and the popped node when the tree is empty.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
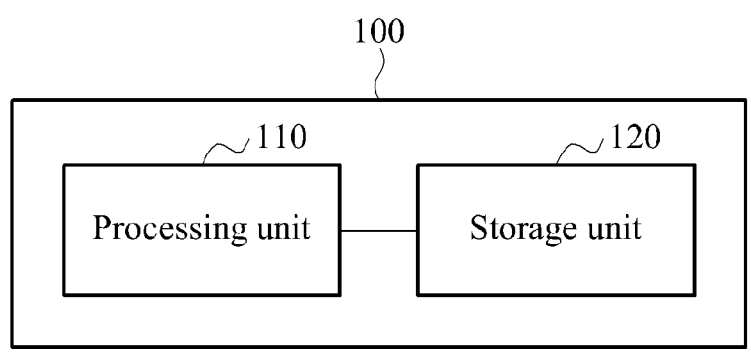
FIG. 1 illustrates an electronic apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

As used herein, a "parent" may refer to a "parent node" and "child" may refer to a "child node". Further, "storing of a node" may refer to storing information identifying a node or information indicating a node, "pushing of a node" may refer to pushing information that predetermines or identifies a node of a tree, "popping of a node" may refer to popping information that predetermines or identifies a node of a tree.

FIG. 1 illustrates an electronic apparatus 100 according to example embodiments.

The electronic apparatus 100 may include a processing unit 110 and a storage unit 120.

The electronic apparatus 100 may refer to a computer, a central processing unit (CPU), or a graphics processing unit (GPU), for example. Alternatively, the processing unit 110 may be the CPU or the GPU, or a core of the CPU or a core of the GPU.

The processing unit 110 may manage a short stack. The storage unit 120 may store data of the short stack. The storage unit 120 may refer to a cache in the processing unit 110.

The processing unit 110 may process a ray casting. Here, the ray casting may refer to searching for a most adjacent primitive being hit by a ray. The processing unit 110 may search for the most adjacent primitive being hit by the ray. A plurality of leaf nodes of a tree may include at least one primitive.

The ray casting may perform a tree traversal (TRV) in a hierarchy, utilizing a hierarchical acceleration structure (AS). The processing unit 110 may use a stack for performing a tree TRV and back tracking a tree. The processing unit 110 may store, in the stack, nodes of a tree to be processed.

A scheme for a stackless TRV may be used for the ray casting because of a storage space and a memory bandwidth used by the stack. When the stack is not used, a re-traversal may be required to be performed from a root node when popping of a node is required. An excessive amount of overlap may occur in a node TRV due to the re-traversal. The processing unit 110 may use the scheme for the stackless TRV using a short stack to reduce the excessive amount of overlap.

The short stack may be a buffer of a fixed, or predetermined, size, whereas a full stack may store data logically unlimited. As used herein, the terms "short stack" and "buffer of the fixed size" may be used interchangeably.

A number of nodes to be stored by the short stack may be limited because the short stack uses a storage space of a fixed size. When a maximum number of nodes to be stored by the short stack are present, the short stack may be full. When a new node is pushed to the short stack, when the short stack is full, a node at a bottom of the short stack may be dropped, and nodes in the short stack may be shifted one by one from a top to a bottom. The top may refer to a position at which pushing and popping occur due to a last-in first-out (LIFO) characteristic of the stack. The node at the bottom of the short stack may be a node stored in the short stack for a first time from among the nodes of the short stack.

Due to a limited size of the short stack as described above, the short stack may fail to store a total number of nodes to be processed for the tree TRV. The tree TRV may need to restart from a root of the tree because the short stack fails to store the total of nodes to be processed. The restart of the tree TRV may be required for an already processed portion of the tree not to be re-entered. In particular, the processing unit 110 may use the short stack that stores a portion of the nodes to be processed for the tree TRV in order to avoid a portion of an expensive restart.

The processing unit 110 may perform the restart when the short stack fails to be popped. The processing unit 110 may perform the restart to store the nodes in the short stack when popping is required to be performed with respect to the short stack when a node is absent in the short stack.

The AS may partition a space. For example, when the AS in which partitioned spaces fail to overlap is used for the ray casting, such as the k-d tree, the restart of the tree TRV may be performed by limiting a TRV range of a ray. An example of the limiting of the TRV range of the ray may include a ray shortening.

Conversely, in the AS in which the partitioned spaces overlap, such as a bounding volume hierarchy (BVH), a scheme for limiting the TRV range of the ray may be omitted. Hereinafter, the overlap of the partitioned spaces will be described in detail with reference to FIG. 2.

Figure 2:
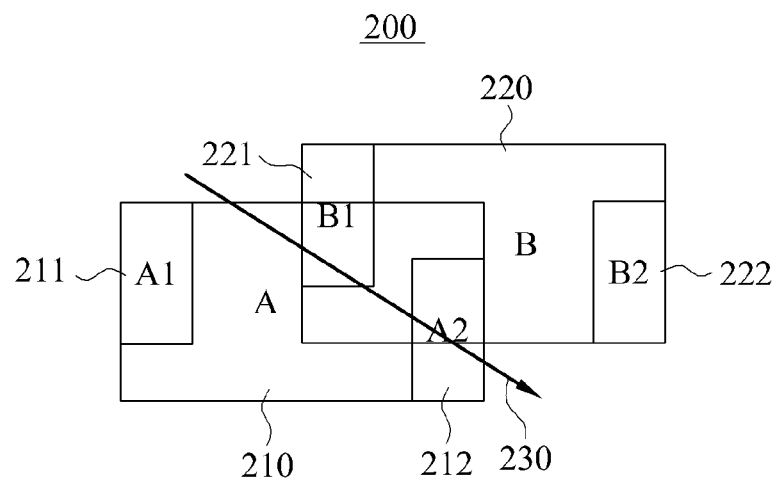
FIG. 2 illustrates an overlap of partitioned spaces according to related art.
Figure 2:
Figure 2:
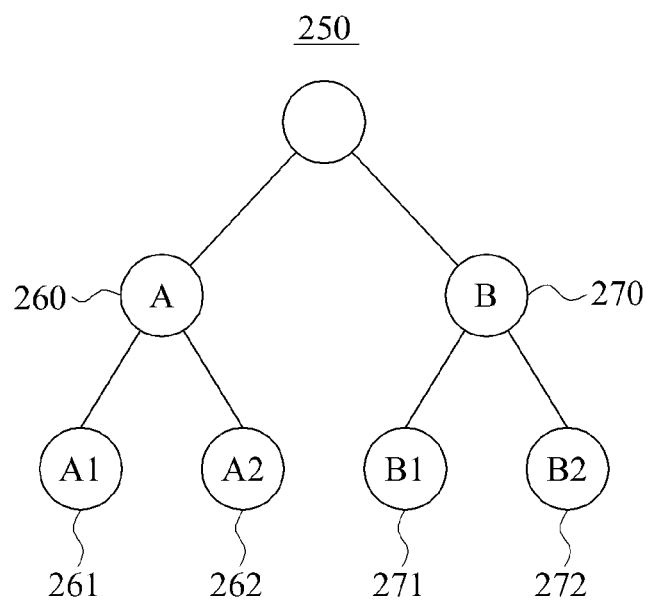

FIG. 2 illustrates an overlap of partitioned spaces according to a related art.

FIG. 2 describes a reason for a ray shortening failing to be used in a BVH.

In a space 200, a space A 210 and a space B 220 may be portions of the space 200. A space A1 211 and a space A2 212 may be portions of the space A 210. A space B1 221 and a space B2 222 may be portions of the space B 220.

An arrow 230 may represent a ray to be cast in the space 200.

In a tree 250, a node A 260, a node A1 261, a node A2 262, a node B 270, a node B1 271, and a node B2 272 may correspond to the space A 210, the space A1 211, the space A2 212, the space B 220, the space B1 221, and the space B2 222, respectively.

The processing unit 110 may restart a tree TRV for a branch of the node B 270 to be processed without a branch of the node A 260 being entered when the processing unit 110 fails to pop a stack entering the node B 270, subsequent to performing a stackless tree TRV with respect to the node A 260 and the node A2 262.

A start of a ray may be disposed subsequent to the node A2 262 to ensure that the branch of the node A 260 is not re-entered. However, when the start of the ray is subsequent to the node A2 262, a TRV of the space B1 221 may be overlooked. Conversely, when the restart of the tree TRV is performed from a start of the node B1 271, the node A 260 and the node A2 262 may be re-entered. The re-entering may result in an infinite loop of the tree TRV or a ray casting.

Although the short stack stores nodes to be entered, a simple short stack may fail to resolve an issue because a sub-tree to be disposed between the node A 260 and the node A2 262 and able to drop the node B 220 from the short stack may exist.

As described above, when the spaces represented by the nodes of the tree overlap, application of the ray shortening may fail.

Referring to FIG. 1, the processing unit 110 may perform the restart of the tree TRV with respect to the AS in which partitioned spaces overlap, using a restart trail. Through the restart trail, the processing unit 110 may perform the restart of the tree TRV with respect to the AS in which the partitioned spaces overlap, without using a stack or using a short stack.

The restart trail may include a single bit per tree level. The restart trail may include at least one bit. The at least one bit may correspond to a single tree level. The storage unit 120 may store the restart trail. The restart trail may be based on explicitly storing a processed portion of a tree hierarchy during the tree TRV, using a single bit per hierarchy level. The processing unit 110 may use the bits stored when the restart is performed as a guide for a TRV.

The bit of the restart trail may be defined as follows.

A bit value being zero may indicate that a node is not entered. Alternatively, the bit value being zero may indicate that the node has two children to be traversed, and a sub-tree under an adjacent child is yet to be traversed completely.

The bit value being "1" may indicate that the node has a single child to be traversed. Alternatively, the bit value being "1" may indicate that the node has two children to be traversed, and a sub-tree under an adjacent child is traversed completely.

An unambiguous sequential order among the children of the node may exist in the TRV. The adjacent child may refer to a child to be traversed for a first time. A far child may refer to a child to be traversed subsequently. The sequential order may fail to change during the TRV. For example, the adjacent child may be a child on a left-hand side of the node. The far child may be a child on a right-hand side of the node.

Figure 3:
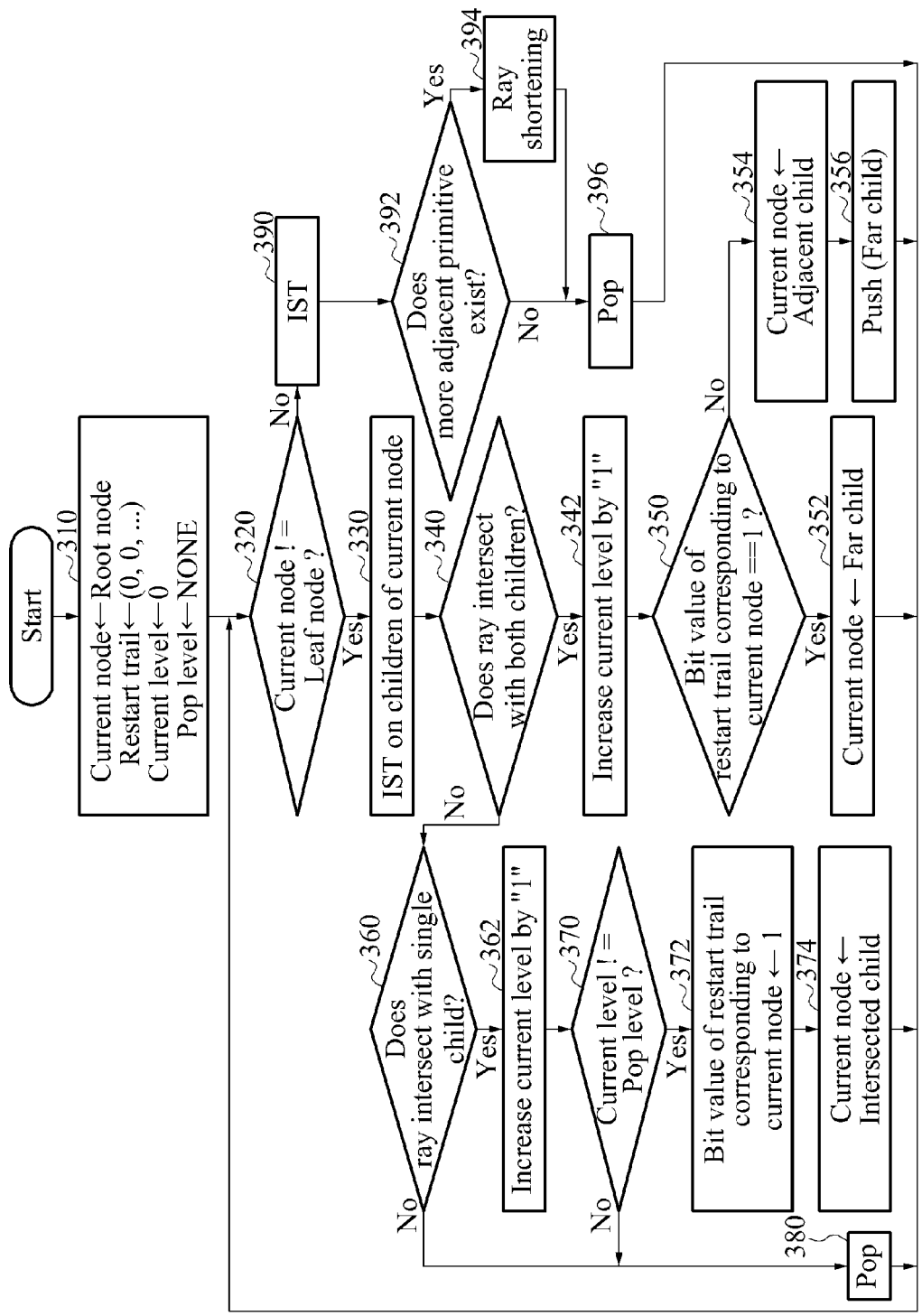
FIG. 3 illustrates a scheme for ray casting according to example embodiments.

FIG. 3 illustrates a scheme for ray casting according to example embodiments.

In a tree TRV, a node to be processed currently may be referred to as a current node. A restart trail may refer to an array of bits. An i-th factor of the restart trail may be represented as "trail[i]". A first factor of the restart trail may be represented as "trail[0]". The first factor of the restart trail may be a sentinel, and may not correspond to a hierarchy level of a tree. In particular, a second factor of the restart trail "trail[1]" may correspond to a root node, and may hold a bit with respect to the root node.

A current level may refer to a bit corresponding to a parent of the current node from among at least one bit of the restart trail. Alternatively, the current level may correspond to the parent of the current node. For example, when the current node is the root node, a parent of the root node is non-existent, and therefore, a value of the current level may be zero indicating a sentinel bit. When the current node is a child of the root node, a bit corresponding to the parent of the current node may be the second factor of the restart trail, and therefore, the value of the current level may be "1".

In operation 310, the processing unit 110 may perform an initialization of the tree TRV.

The processing unit 110 may set the current node to indicate a root of a tree.

The processing unit 110 may initialize the restart trail. A total of values of the at least one bit of the restart trail may be zero because the TRV is yet to be performed on any node of the tree. The processing unit 110 may set the at least one bit of the restart trail to be zero.

The processing unit 110 may initialize the current level. The current level may indicate the sentinel bit because a node to be traversed for a first time is the root node. The processing unit 110 may set the value of the current level to be zero.

The processing unit 110 may initialize a pop level. The pop level may indicate a level at which popping of a stack is performed for a last time. The pop level may not have a value because the popping of the stack is yet to be performed. Alternatively, the pop level may fail to have a value correspond to a level of a tree, for example, "−1".

Subsequent to the initialization, the processing unit 110 may perform operations 320 to 396 repeatedly.

In operation 320, the processing unit 110 may determine whether the current node is a leaf node. When the current node is determined to be the leaf node, the processing unit 110 may perform operations 390 to 396 of an intersection test (IST) with respect to a primitive. When the current node is determined not to be the leaf node, the processing unit 110 may perform operations 330 to 380 of the IST with respect to children.

In operation 330, the processing unit 110 may perform the IST on a ray and respective children of the current node.

In operation 340, the processing unit 110 may determine whether the ray intersects both of the children of the current node. When the ray is determined to intersect both of the children of the current node, the processing unit 110 may perform operations 342 to 356. When the ray is determined not to intersect both of the children of the current node, the processing unit 110 may perform operations 360 to 380.

In operation 342, the processing unit 110 may increase a value of the current level by "1". The increase of the value of the current level by "1" may indicate that a node to be newly processed may be changed to the children of the current node. In particular, the children of the current node may become a new current node.

In operation 350, the processing unit 110 may examine a bit value of the restart trail corresponding to the current node. As described above, in general, the current level may indicate a bit corresponding to a parent of the current node. The current level is increased by "1" already in operation 342. Accordingly, the current level in operation 350 may indicate a bit corresponding to the current node. Therefore, the bit of the restart trail corresponding to the current level may be represented as "trail[current level]". A value of the current level may be a value of an index of the bit of the restart trail.

When the bit value of the restart trail is "1", the processing unit 110 may perform operation 352. When the bit value of the restart trail is zero, the processing unit 110 may perform operations 354 and 356.

In operation 352, the processing unit 110 may set a far child of the current node to be a new current node. The new current node may be considered to have two children because operation 342 is passed. As described above with reference to FIG. 1, the bit value of the restart trail being "1" may indicate that a sub-tree under an adjacent child of a node is traversed completely. Accordingly, the adjacent child of the current node may be unnecessary to be traversed, and the far child may be a new object to be traversed, being a new current node. In particular, the TRV of the adjacent child by the bit of the restart trail may be skipped.

In operation 354, the processing unit 110 may set the adjacent child of the current node to be a new current node. As described above with reference to FIG. 1, the bit value corresponding to a node being zero may indicate that a sub-tree under the adjacent child is yet to be traversed completely. Accordingly, the adjacent child of the current node may be traversed.

In operation 356, the processing unit 110 may push the far child of the current node to the short stack. The far child of the current node may be required to be traversed subsequent to an end of a TRV with respect to the sub-tree under the adjacent child of the current node. Accordingly, as the current node is changed to the adjacent child, the far child may be stored in the short stack. Hereinafter, the pushing of operation 356 will be described in detail with reference to FIG. 4.

Subsequent to completing operation 352 or operation 356, the processing unit 110 may repeat operation 320.

In operation 360, the processing unit 110 may determine whether the ray intersects a single child of the current node. When the ray is determined to intersect the single child of the current node, the processing unit 110 may perform operations 362 to 380.

When the ray is determined not to intersect the single child of the current node, the processing unit 110 may perform operation 380. When the ray is determined not to intersect any children of the current node, a further IST may be unnecessary to be performed with respect to the sub-tree under the current node. Accordingly, in operation 380, the processing unit 110 may pop a node from the short stack. The processing unit 110 may set the popped node to be a current node. Hereinafter, the popping of operations 380 and 396 will be described in detail with reference to FIG. 5.

In operation 362, the processing unit 110 may increase a value of the current level by "1". The increase of the value of the current level may indicate that a node to be newly processed is changed to a child intersecting with a ray of the current node. In particular, the child intersecting with the ray of the current node may become a new current node.

In operation 370, the processing unit 110 may determine whether the value of the current level differs from a value of the pop level. As described above, the pop level may indicate a level at which the popping of the stack is performed for the last time. In particular, the processing unit 110 may determine whether the current node is a parent of the node popped by a previous pop calculation. The value of the current level being equal to the value of the pop level may indicate that the current node is the parent of the node popped by the previous pop calculation.

When the value of the current level differs from the value of the pop level, the processing unit 110 may perform operations 372 and 374.

In operation 372, the processing unit 110 may set the bit value of the restart trail corresponding to the current node to be "1". As described above, in general, the current level may indicate the bit corresponding to the parent of the current node. The current level is already increased by "1" in operation 362. Accordingly, the current level of operation 372 may indicate the bit corresponding to the current node. Therefore, the bit of the restart trail corresponding to the current level may be represented as "trail[current level]".

As described above with reference to FIG. 1, the bit value of the restart trail being "1" may indicate that the node has a single child to be traversed. In operation 374, the processing unit 110 may set the child intersecting the ray of the current node to be a new current node. Through operations 372 and 374, the processing unit 110 may set the bit value of the restart trail corresponding to the current node to match the definition of the bit, and perform the TRV with respect to the child intersecting with the ray of the current node.

When the value of the current level is equal to the value of the pop level, the processing unit 110 may perform operation 380.

The value of the current level being equal to the value of the pop level may indicate that the current node has two children intersecting with an original ray, the adjacent child of the current node is traversed completely, and the far child of the current node is popped from the short stack. The pushing of operation 356 may be performed with respect to the far child of the current node. Accordingly, the adjacent child of the current node may fail to be popped. Therefore, the current node being the parent of the node popped by the previous pop calculation may indicate that the node popped by the previous pop calculation is the far child of the current node. In operation 360, only a single child of the current node intersecting with the ray may indicate that the processing unit 110 shortens the ray while processing with respect to the adjacent child, and that the far child may no longer intersect the ray, due to the ray being shortened. In operation 380, the processing unit 110 may pop a node from the short stack because the far child no longer intersects with the ray. The processing unit 110 may set the popped node to be the current node.

When the current node is a leaf node, operation 390 may be performed.

In operation 390, the processing unit 110 may perform the IST between at least one primitive in a node, respectively, and the ray.

In operation 392, the processing unit 110 may determine whether a more adjacent primitive exists than the primitive intersecting with a ray discovered last through the IST. When the more adjacent primitive is determined to exist, the processing unit 110 may perform operation 394. When the more adjacent primitive is determined to be absent, the processing unit 110 may perform operation 396.

The more adjacent primitive discovered through the IST may be stored as a most adjacent primitive intersecting with the ray.

In operation 394, the processing unit 110 may shorten the ray to match the more adjacent primitive discovered through the IST.

In operation 396, the processing unit 110 may pop a node from the short stack because the IST with respect to the leaf node is completed. The processing unit 110 may set the popped node to be a new current node.

Subsequent to performing operation 352, 365, 374, 380, or 396, the processing unit 110 may repeat operation 320 with respect to the new current node.

Figure 4:
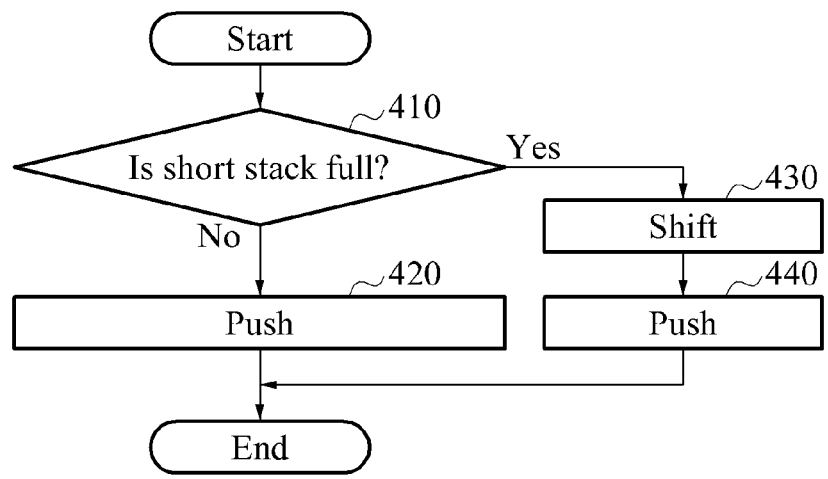
FIG. 4 illustrates pushing of a short stack according to related art.

FIG. 4 illustrates pushing of a short stack according to related art.

Operation 356 described above with reference to FIG. 3 may correspond to operations 410 to 440.

In operation 410, the processing unit 110 may determine whether the short stack is full. When the short stack is determined to be full, the processing unit 110 may perform operation 430. When the short stack is determined not to be full, the processing unit 110 may perform operation 420.

When the short stack is determined not to be full, pushing a node to the short stack may not be difficult. In operation 420, the processing unit 110 may push the node to the short stack.

When the short stack is determined to be full, the processing unit 110 may shift the short stack. A node pushed to the short stack for a first time may be dropped through shifting.

Through the shifting, a space for pushing a new node to the short stack may be created.

In operation 440, the processing unit 110 may push a node to the short stack.

The pushed node may be a far child of operation 356 described above with reference to FIG. 3.

Figure 5:
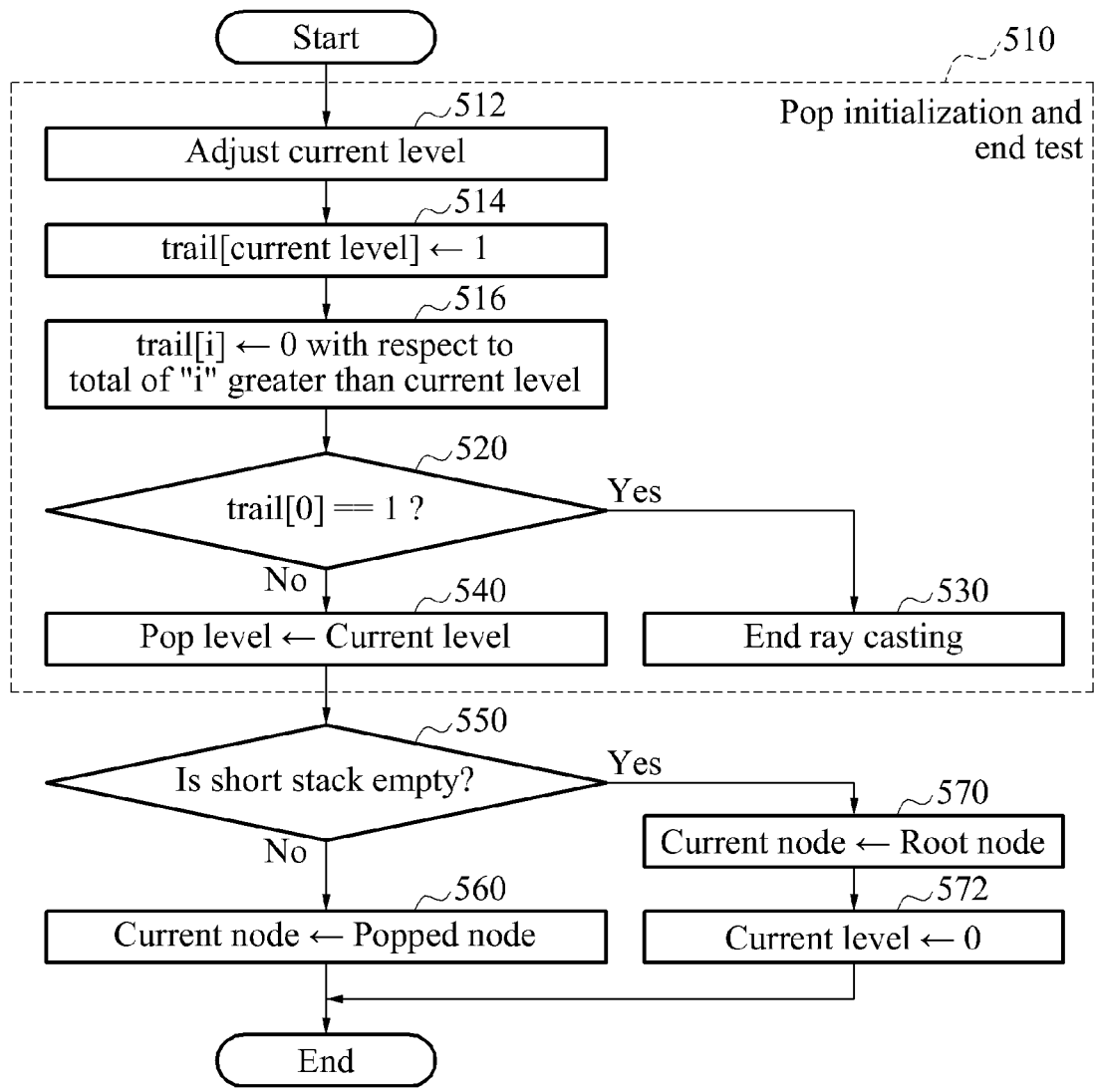
FIG. 5 illustrates popping of a short stack according to related art.

FIG. 5 illustrates popping of a short stack according to related art.

Operations 380 and 396 described above with reference to FIG. 3 may include operations 510 to 572.

In operation 510, the processing unit 110 may perform a pop initialization and an end test. The pop initialization may refer to setting at least one bit value of a restart trail. The end test may refer to determining whether a ray casting is ended.

Operation 510 may include operations 512 to 540.

In the popping of the short stack, the processing unit 110 may update the restart trail to reflect that a current node is processed completely. The update may be performed by operations 512, 514, and 516.

In operation 512, the processing unit 110 may adjust a current level. The processing unit 110 may search for a level corresponding to a next unprocessed node.

When "x" is greater than zero, and is an integer less than a value of a current level, a value of "trail[x]" being zero may indicate that a TRV with respect to a child of a node corresponding to "trail[x]" is not performed completely. Also, the value of "trail[x]" being zero may indicate that a far child of the node corresponding to "trail[x]" is a subsequent node in the short stack. Here, the subsequent node may refer to a node to be popped from the short stack by a subsequent pop calculation. Accordingly, the processing unit 110 may traverse the child of the node corresponding to "trail[x]" having the value of zero. The value of "trail[x]" being "1" may indicate that the TRV with respect to the child of the node corresponding to "trail[x]" is performed completely.

Within a range of an index greater than zero and less than the value of the current level, bits having a value of zero from among at least one bit of the restart trail may be plural. In this instance, based on a principle of a tree TRV, the processing unit 110 may traverse a child of a node corresponding to a bit of which an index value is greatest from among the plurality of bits. In particular, when a plurality of child nodes fails to be traversed completely, the processing unit 110 may traverse a child of a node in a far bottom of a tree structure from among the nodes.

In particular, the processing unit 110 may search for a node to be traversed subsequently by searching for a bit having a value of zero and being most adjacent above a current level from among the at least one bit of the restart trail, and may search for a level corresponding to a parent of the node to be traversed subsequently.

The processing unit 110 may select a bit of which an index value is greatest from among candidate bits of the restart trail. An index value of the candidate bits from among the at least one bit of the restart trail may be greater than zero and less than a value of a current level, and a value of the candidate bits may be zero. The processing unit 110 may set the value of the current level to be the index value of a selected bit, such that the current level indicates the selected bit.

For example, the processing unit 110 may search for a bit having a value of zero from among the at least one bit of the restart trail in a sequential order of an index from the value of the current level to zero. The processing unit 110 may search for a bit having a greatest index value from among bits having a value of zero of the restart trail within the range of the index being greater than zero and less than the value of the current level. The processing unit 110 may set the value of the current level to be an index value of the bit found.

As the current level indicates a bit having a value of zero, a synchronization between a node to be popped from a short stack and the current level may be performed in operation 560.

In operation 514, the processing unit 110 may set a bit value of which an index value is a value of a current level from among the at least one bit of the restart trail to be "1". The processing unit 110 may set the bit value indicated by the current level from among the at least one bit of the restart trail to be "1".

As described above, the current level may indicate a bit corresponding to a parent of a current node from among the at least one bit of the restart trail. In particular, a bit indicated by the current level may correspond to a parent of a node to be traversed subsequently. The current node may be a far child of the node corresponding to the bit indicated by the current level. A TRV with respect to the current node, being the far child, may be performed in the following operations. The TRV with respect to the far child being performed may refer to completion of a TRV with respect to an adjacent child. To reflect the completion, the processing unit 110 may search for a bit having a value of zero, and change the bit value from zero to "1" in operation 514.

In operation 516, the processing unit 110 may set bit values of which an index value is greater than a value of a current level from among the at least one bit of the restart trail to be zero.

The current level may indicate a bit corresponding to a parent of the current node from among the at least one bit of the restart trail. Bit values of which an index value is greater than the value of the current level may be set to be zero because a TRV of the current node and a sub-tree under the current node is yet to be performed. The set may indicate that the current node and nodes of the sub-tree under the current node are yet to be entered.

In operation 520, the processing unit 110 may determine whether a bit value of which an index value of a restart trail is zero is "1". A bit of which the index value is zero may be a sentinel bit. In particular, the bit of which the index value is zero may correspond to a virtual parent of a root node. The bit value of which the index value is zero being "1" may indicate that a TRV with respect to a root node and sub-trees under the root node is completed, and in operation 514, a value of the sentinel bit is flipped. Accordingly, when the value of the sentinel bit is "1", the processing unit 110 may perform operation 530, and in operation 530, the processing unit 110 may end a scheme for ray casting described above with reference to FIG. 3.

When the value of the sentinel bit fails to be "1", the processing unit 110 may perform operation 540.

In operation 540, the processing unit 110 may set a value of a pop level to be a value of a current level.

A node corresponding to the current level may be a parent of a current node. In particular, an adjacent child of the node corresponding to the current level may be marked to be processed completely. To prepare a restart, the processing unit 110 may save the mark in the pop level. In particular, a set of the value of the pop level may reflect that a TRV with respect to the adjacent child corresponding to the current level is processed completely. When a restart of the TRV is forced by the mark, a tree TRV may be ensured to arrive at a node in which a pop calculation is performed.

In operation 550, the processing unit 110 may determine whether the short stack is empty.

When the short stack is determined not to be empty, the processing unit 110 may perform operation 560. When the short stack is determined to be empty, the processing unit 110 may perform a process required for a restart by performing operations 570 and 572.

In operation 560, the processing unit 110 may pop a node from the short stack. The processing unit 110 may set a current node to be a node popped. In particular, a far child stored in a stack may become a new current node. A restart trail and a current level may match the popped node by the set, respectively, and a TRV may continue.

In operation 570, the processing unit 110 may set a current node to be a root node.

In operation 572, the processing unit 110 may set a value of the current level to be zero.

When a node fails to be popped from the short stack, the processing unit 110 may perform a restart of a tree TRV through operations 570 and 572.

FIGS. 6A through 6I illustrate a comparison between an operation of a short stack and an operation of a full stack according to example embodiments.

FIGS. 6A through 6I show the full stack and the short stack. The full stack is illustrated as having 24 slots. The 24 slots may be exemplary, and the full stack may store a number of nodes greater than 24, as necessary. The short stack is illustrated as having 8 slots. Here, the short stack may store up to a total of 8 nodes.

Referring to FIGS. 6A through 6I, a scheme for a restart trail, using a short stack, is described.

Figure 6A:
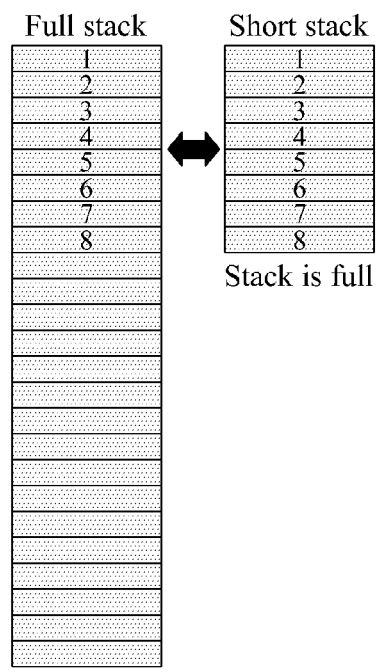
FIGS. 6A through 6I illustrate a comparison between an operation of a short stack and an operation of a full stack according to example embodiments.

FIG. 6A illustrates a result of pushing 8 nodes in a sequential order.

The short stack may be in a full state in which the 8 slots are filled.

Figure 6B:
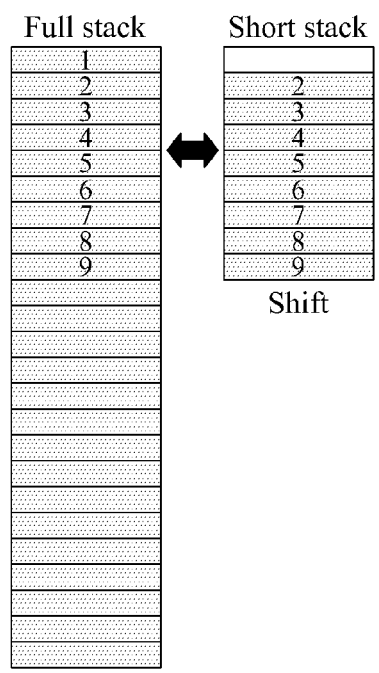

FIG. 6B illustrates a result of pushing a 9-th node.

The full stack may store the 9-th node additionally. However, the short stack may be full in advance. Accordingly, the short stack may be shifted to store the 9-th node additionally. A node pushed for a first time by the shifting in the short stack may be dropped. Subsequent to the shifting, the short stack may store the 9-th node additionally.

Figure 6C:
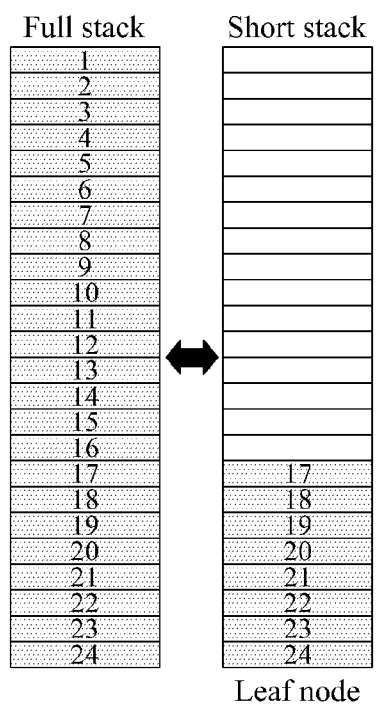

FIG. 6C illustrates a result of pushing 24 nodes in a sequential order.

FIG. 6C illustrates a state of stacks when the tree TRV arrives at a leaf node or a state of stacks at a point at which a node is to be popped. In particular, a popping of a node may occur subsequent to the pushing of the 24 nodes to the stack by the tree TRV.

The full stack may store a total of the 24 nodes pushed. The short stack may only store the 8 nodes pushed last.

Figure 6D:
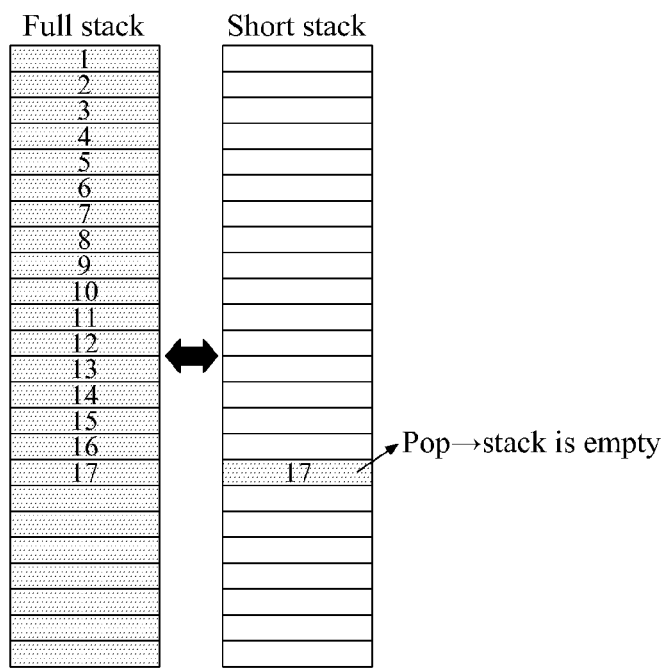

FIG. 6D illustrates a state of 7 nodes being popped successively.

The full stack and the short stack may pop 7 nodes pushed last.

In this instance, when one more node is popped from the short stack, the short stack may become empty. When the short stack is empty, a re-traversal may be performed. A pop level may indicate a position to end the re-traversal. The pop level may indicate a level of a 17-th node popped last.

Figure 6E:
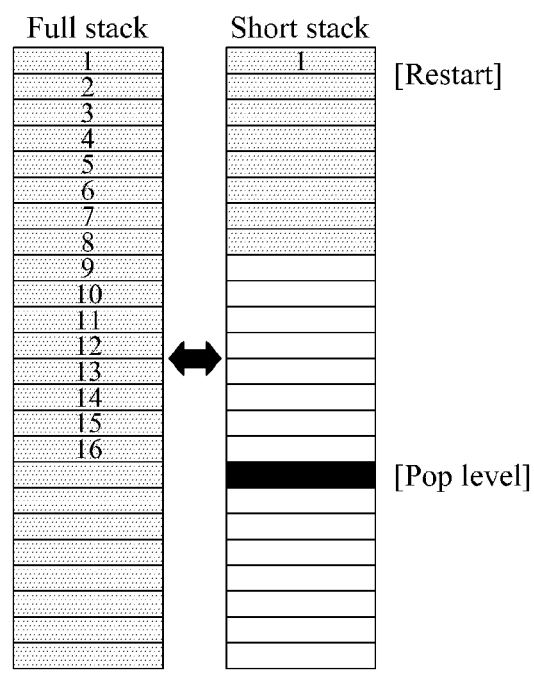

FIG. 6E illustrates a state of a first node being pushed in the short stack by performing a restart.

When 8 nodes are popped successively, the full stack may store 16 nodes. However, a restart may be performed to re-fill the short stack because the short stack may become empty. The first node in the short stack may be re-pushed by the restart.

Figure 6F:
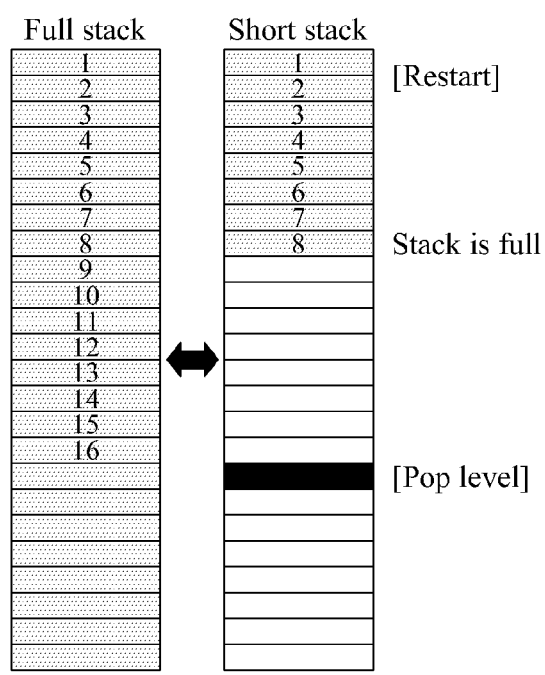

FIG. 6F illustrates a state of the 8 nodes being re-pushed, to the short stack, subsequent to the restart.

Until the 8 nodes are stored, a total of nodes pushed by the restart may be stored in the short stack.

Figure 6G:
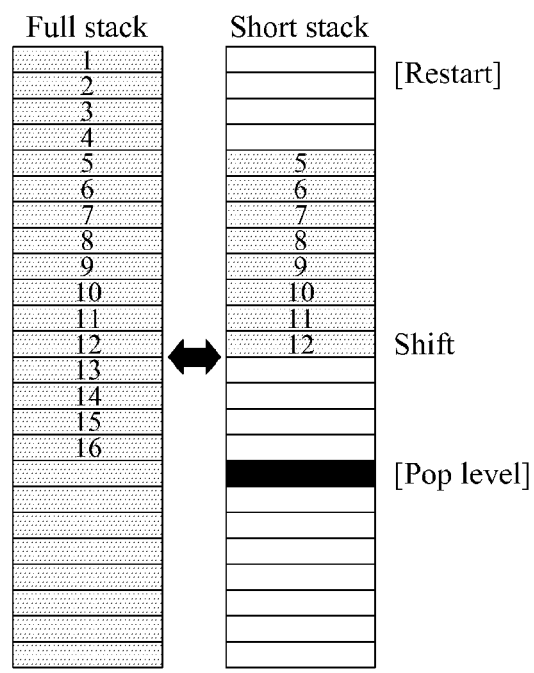

FIG. 6G illustrates a state of 12 nodes being re-pushed, to the short stack, subsequent to the restart.

In a case of a short node, up to a total of 8 nodes may be stored, and therefore, a first node already stored by a restart to a fourth node may be dropped in a sequential order by the shifting. Accordingly, the short node may store from a 5-th node to a 12-th node.

Figure 6H:
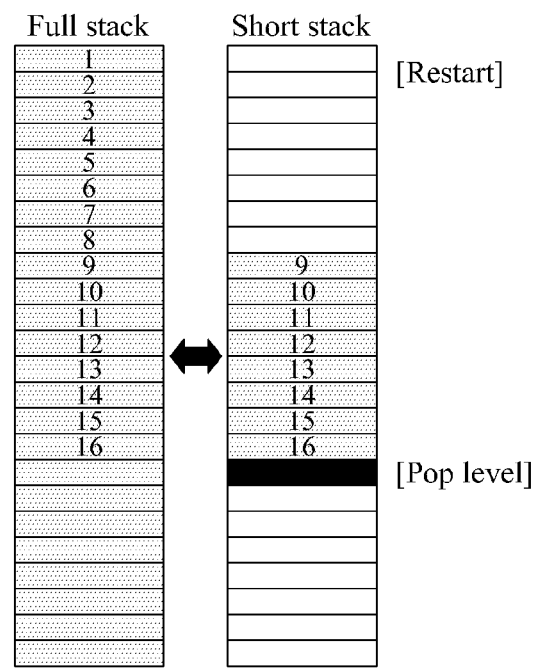

FIG. 6H illustrates a state of the restart being completed.

Prior to performing the restart, the tree TRV may be completed when a 16-th node is pushed to the short stack because a 17-th node is popped. The processing unit 110 may determine a position to return through the restart by referring to a value of a pop level.

Figure 6I:
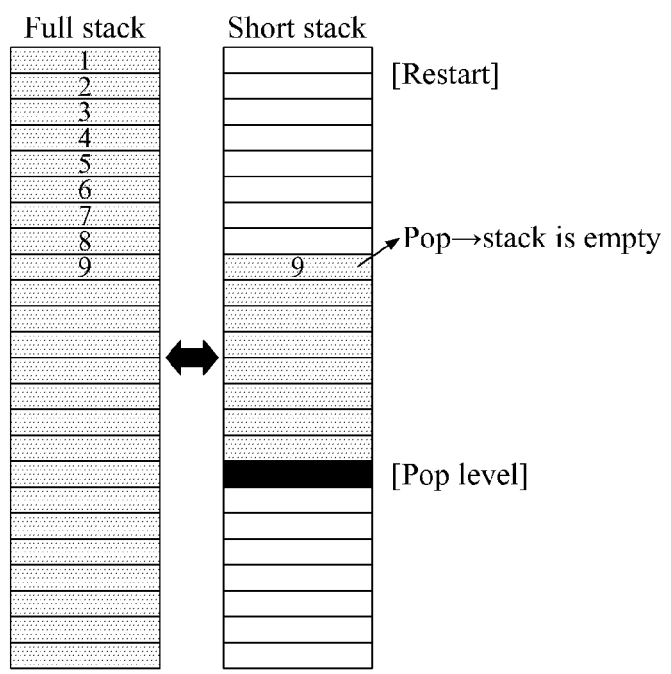

FIG. 6I illustrates a state of the short stack being empty again, subsequent to the restart being completed.

In FIG. 6I, the full stack may store 9 nodes. The short stack may store a single node.

In this instance, when one more node is to be popped from the short stack, the short stack may become empty. When the short stack is empty, a second re-traversal may be performed. The pop level may indicate a position at which the re-traversal is to be ended. The pop level may indicate a level of a 9-th node popped last.

The first node to the 9-th node may be pushed to the short stack by the second re-traversal in a sequential order.

In a restart trail TRV process described above, the first node to an 8-th node are traversed up to a total of three times. The 9-th node to a 17-th node are traversed two times. In particular, when the short stack is used, performing an overlapping TRV at least once may be required to fill an empty short stack. A total of or a portion of an unnecessary overlapping TRV may be removed by adjusting a node in which the re-traversal is performed.

FIGS. 7A through 7G illustrate a restart trail during a tree TRV according to a related art.

The tree TRV is illustrated in FIGS. 7A through 7G. In a tree, a circle may represent a hierarchy node in which a downward TRV continues. A square may represent a node in which a popping is performed. The square may represent a node of which children do not intersect a ray from among intermediate rays inside a leaf node or a tree. In the tree, a left child may be an adjacent child, and a right child may be a far child. An arrow indicating a bottom of the tree may represent a trail point subsequent to a respective TRV.

At least one bit of a restart trail is illustrated on a left-hand side of the tree. A sentinel bit, being a most significant bit (MSB), is illustrated on top. In particular, a row in which a respective bit is disposed may correspond to an index of a bit.

Figure 7A:
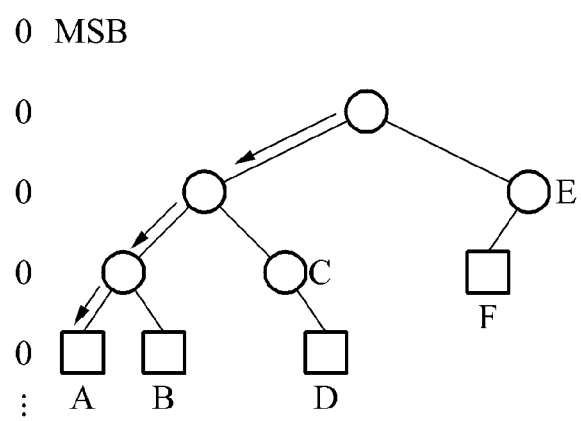
FIGS. 7A through 7G illustrate a restart trail during a tree traversal (TRV) according to related art.

FIG. 7A illustrates a state of a trail leading to a node A, subsequent to an initialization.

Figure 7B:
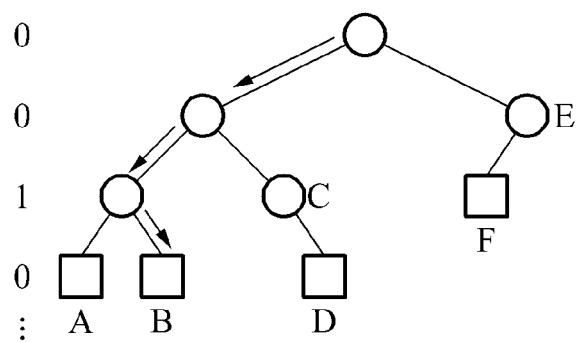

FIG. 7B illustrates a state of a trail leading to a node B, subsequent to a popping of the node A. When the node A is popped, the restart trail may be updated. The trail may lead to the node B by the update.

Figure 7C:
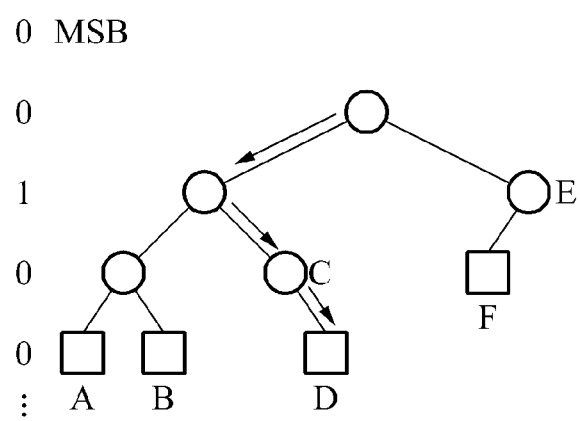

FIG. 7C illustrates a state of a trail leading to a node D, subsequent to a popping of the node B.

When the node B is popped, the restart trail may be updated. The trail may lead to the node D by the update.

Figure 7D:
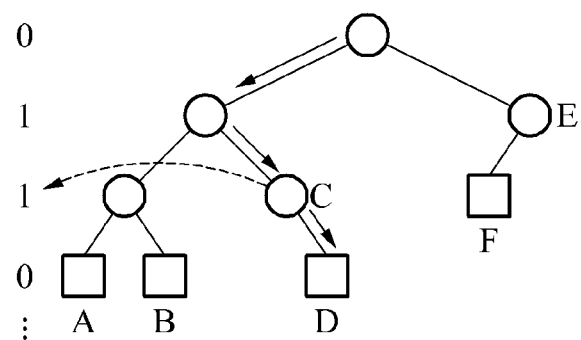

FIG. 7D illustrates a TRV through a node C that sets a fourth bit of the restart trail.

Figure 7E:
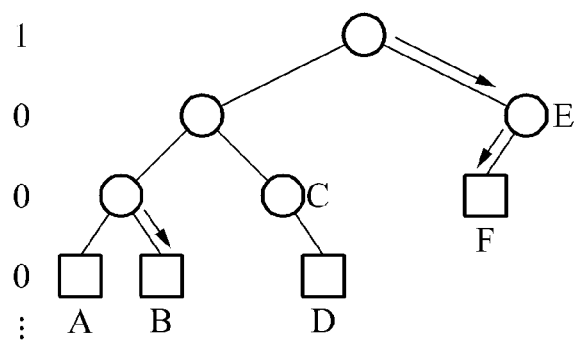

FIG. 7E illustrates a state of a trail leading to a node F, subsequent to a popping of the node D.

When the node D is popped, the restart trail may be updated. The trail may lead to the node F by the update.

Figure 7F:
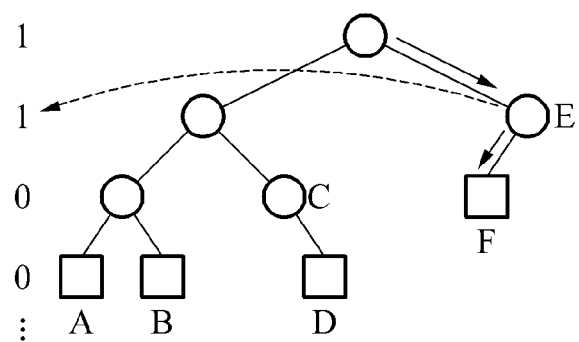

FIG. 7F illustrates a TRV through a node E that sets a third bit of the restart trail.

Figure 7G:
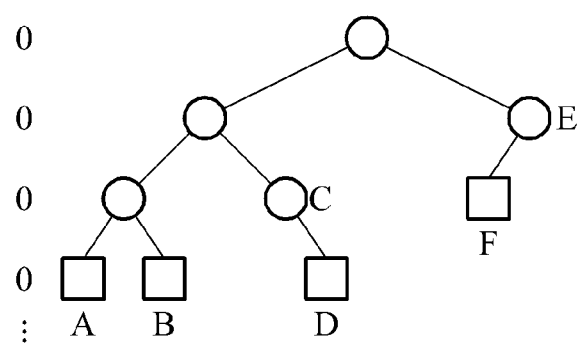

FIG. 7G illustrates a sentinel bit being flipped, subsequent to a popping of the node F.

The tree TRV may be ended by the sentinel bit being flipped.

Figure 8:
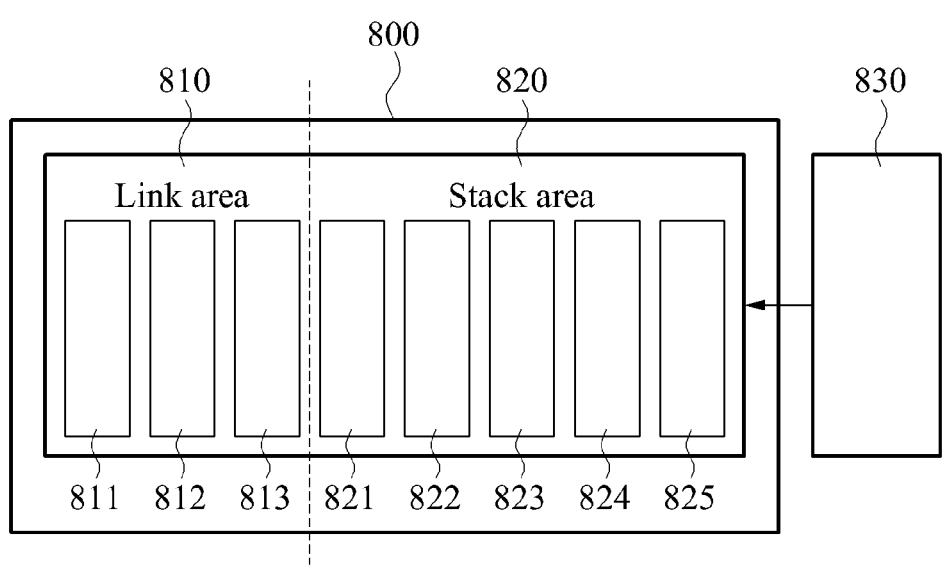
FIG. 8 illustrates a short stack including a link area and a stack area according to example embodiments.

FIG. 8 illustrates a short stack including a link area 810 and a stack area 820 according to example embodiments.

As described above with reference to FIG. 1, the processing unit 110 may manage the short stack for a tree TRV, and the storage unit 120 may store data of the short stack. A tree may refer to an AS in which partitioned spaces overlap. The tree may refer to a BVH.

When a restart is always performed from a root node, an unnecessary overlapping TRV may occur. The processing unit 110 may perform the restart of the tree TRV from an intermediate node to fill the short stack when the short stack is empty. The intermediate node may be a node disposed between the root node and a node popped from the short stack last.

The processing unit 110 may predetermine the intermediate node by storing a link indicating the intermediate node in the storage unit 120. The processing unit 110 may store the link in the storage unit 120 at a point of a predetermined condition being satisfied, for example, when the short stack is full. The processing unit 110 may read the link from the storage unit 120 at a point at which the restart is performed, and the intermediate node may be identified using the read link.

To manage the link and the short stack, the processing unit 110 may manage a buffer 800 of a fixed size. The buffer 800 may be the aforementioned short stack. The storage unit 120 may store data of the buffer 800.

The buffer 800 may include the link area 810 and the stack area 820. The buffer 800 may store the link indicating the intermediate node in the link area 810.

The buffer 800 may store the short stack in the stack area 820. Alternatively, when the buffer 800 is the short stack, the buffer 800 may manage slots of the short stack through partitioning the slots into the link area 810 and the stack area 820.

The buffer 800 may further include a temporary space 830. The temporary space 830 may store a node to be pushed to the stack area 820, and store a node popped from the stack area 820. The temporary space 830 may store a link to be stored in the link area 810, or store a link to be read from the link area 810.

The stack area 820 may include at least one slot. As the at least one slot of the stack area 820, a first slot 821, a second slot 822, a third slot 823, a fourth slot 824, and a fifth slot 825 are illustrated. The at least one slot may store a node pushed.

The link area 810 may include at least one slot. As the at least one slot of the link area 810, a first slot 811, a second slot 812, and a third slot 813 are illustrated.

The at least one slot may store a link. As an example, the link may be a plurality of links. The processing unit 110 may store the plurality of links in the storage unit 120. The processing unit 110 may predetermine an intermediate node, using the plurality of links stored. For example, the processing unit 110 may predetermine the intermediate node, using a link indicating a node having a highest level from among the plurality of links stored.

The processing unit 110 may variably adjust a size of the stack area 820 storing the short stack and a size of the link area 810 storing the plurality of links. For example, the processing unit 110 may determine a number of the plurality of links, based on a maximum value of a number of nodes pushed during a tree TRV. The processing unit 110 may determine the number of the plurality of links, based on the maximum value of the number of nodes pushed during the tree TRV and a size of the short stack. The processing unit 110 may determine the size of the link area 810, based on the number of the plurality of links determined.

When the plurality of links are already stored in the link area 810 to a maximum, an additional link may further be stored. The processing unit 110 may drop a link stored for a first time from among the plurality of links in the link area 810 by shifting the link area 810. When an empty slot is created by the dropping, the processing unit 110 may store the additional link in the link area 810. In particular, a plurality of slots in the link area 810 may operate as the short stack. The buffer 800 may refer to the short stack, provided by the electronic apparatus 100, used as two sub-short stacks, being the link area 810 and the stack area 820, by the processing unit 110.

Hereinafter, a detailed scheme for using a link is described with reference to FIGS. 9A to 9C.

Figure 9A:
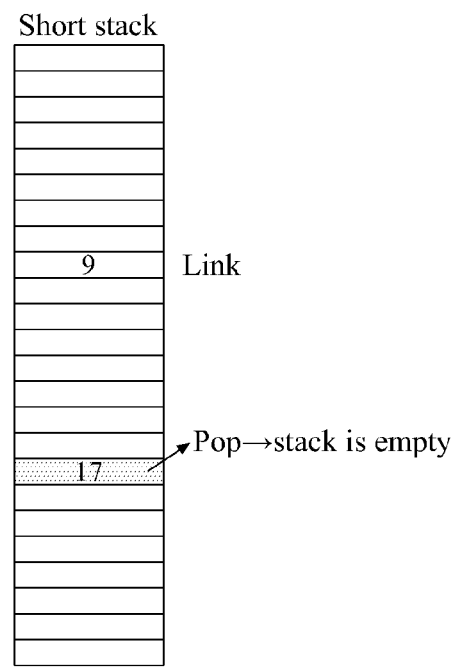
FIGS. 9A through 9C illustrate an operation of a short stack using a link according to example embodiments.
Figure 9B:
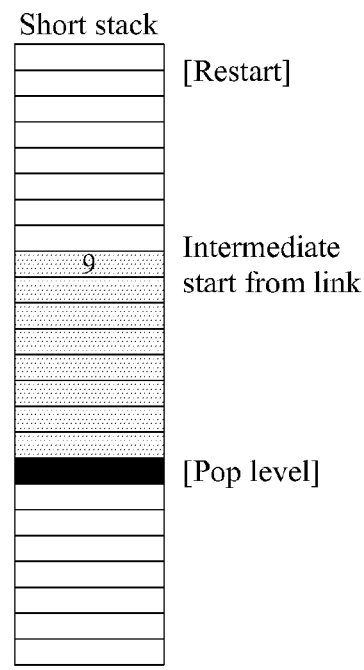
Figure 9C:
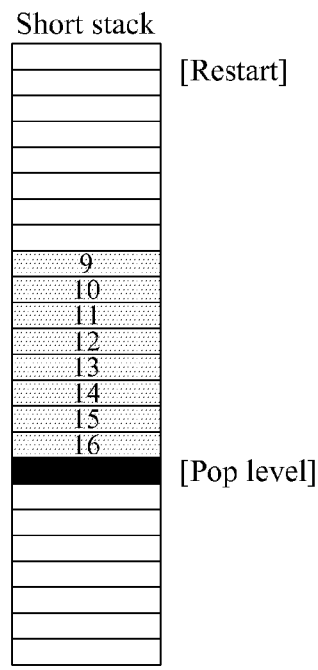

FIGS. 9A through 9C illustrate an operation of a short stack using a link according to example embodiments.

FIG. 9A illustrates a state of 7 nodes being popped successively from the short stack. The short stack may pop 7 nodes pushed last.

In this instance, when one more node is popped from the short stack, the short stack may become empty. When the short stack is empty, a re-traversal may be performed by the processing unit 110.

A link may refer to a position or a node at which the re-traversal is to be performed.

A pop level may indicate a position at which the re-traversal is to be ended. The pop level may indicate a level of a 17-th node popped last.

Through a restart from the first node indicated by the link, the short stack may store the first node to a second node. Here, the second node may be a node pushed to the short stack, prior to a node corresponding to the pop level. The second node may be a node pushed to the short stack, prior to a third node. The third node may be a node popped from the short stack, immediately prior to a restart being performed. For example, the processing unit 110 may store the first node as a link. The first node may be a node that enables nodes from the first node to the second node to be pushed to the short stack when the restart is performed by the processing unit 110. The second node may be a node pushed to the short stack, prior to the third node indicated by the pop level. In particular, the first node may be a node that enables an "n" number of nodes dropped last from the short stack to be re-pushed to the short stack by the restart. Here, "n" denotes a number of nodes to be stored by the short stack, and may be an integer greater than "1".

FIG. 9B illustrates a state in which a re-traversal commences from a point of an intermediate node indicated by the link.

By an intermediate start from the link, a 9-th node indicated by the link may be pushed to the short stack.

FIG. 9C illustrates a state of the re-traversal being completed.

Through the re-traversal, the 9-th node to a 16-th node may be pushed in the short stack. The short stack may become full by the re-traversal commencing from the point of the intermediate node because the short stack stores up to a total of 8 nodes. The restart may be ended through the short stack becoming full because a tree TRV arrives at the pop level as the short stack becomes full.

According to FIGS. 9A to 9C, when a depth of a tree is 24, an overlap of the re-traversal may be prevented through indicating the 9-th node by the link. However, when the depth of the tree is greater than 24, a 17-th node may be required to be indicated by the link. More particularly, more than two links may be required to be stored to prevent an overlapping TRV.

For example, when the depth of the tree is "m", and a size of the short stack is "n", a (n+1)-th node, a (2n+1)-th node, a (3n+1)-th node, and the like, may be indicated by links. Here, "m" and "n" may be an integer greater than "1". "m" may be a maximum value of a number of nodes pushed during the tree TRV. The processing unit 110 may determine a quotient obtained through dividing (m−n×1) by "n" to be a number of links.

Figure 10:
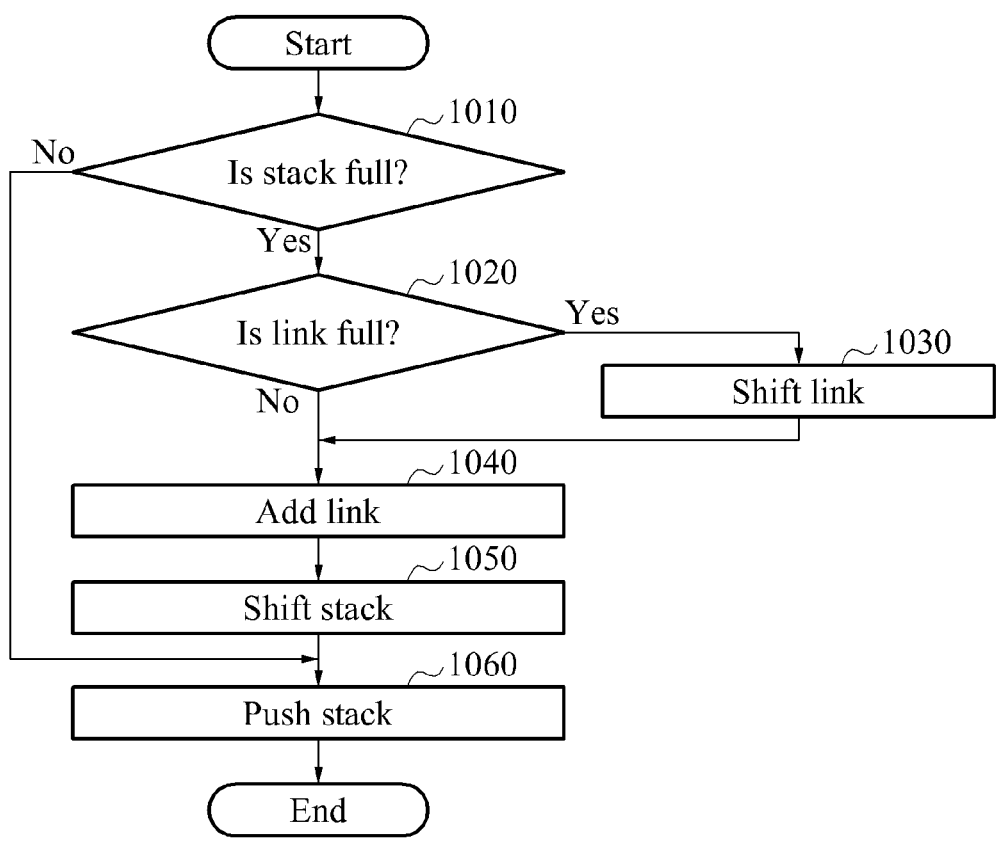
FIG. 10 illustrates pushing of a short stack using a link according to example embodiments.

FIG. 10 illustrates pushing of a short stack using a link according to example embodiments.

Referring to FIG. 3, operation 356 may correspond to operations 1010 to 1060.

In operation 1010, the processing unit 110 may determine whether the short stack is full. When the short stack is determined to be full, the processing unit 110 may perform operation 1020. When the short stack is determined not to be full, the processing unit 110 may perform operation 1060.

When the short stack is determined not to be full, pushing a node to the short stack may not be difficult. In operation 1060, the processing unit 110 may push the node to the short stack.

When the short stack is determined not to be full, the link may be required to be added or updated.

In operation 1020, the processing unit 110 may determine whether the link is full. The link being full may indicate that a maximum number of links is stored already in the link area 810 of the buffer 800. When the link is determined to be full, the processing unit 110 may perform operation 1030. When the link is determined not to be full, the processing unit 110 may add operation 1040.

In operation 1030, the processing unit 110 may shift the links stored in the link area 810 through shifting the link area 810. Through the shifting of the link area 810, a link stored for a first time may be dropped, and an empty slot may be created in the link area 810.

In operation 1040, the processing unit 110 may add a link to the link area 810. The added link may indicate an intermediate node at which a re-traversal is to be performed.

The adding of the link in operations 1020 to 1040 may be optional. The processing unit 110 may update the link stored.

For example, the processing unit 110 may store only (kn+1)-th nodes as a link. Here, "n" may have a size of the short stack. "k" may be an integer greater than "1".

Alternatively, the processing unit 110 may store a (j−n+1)-th node as a link when a j-th node is dropped from the short stack. Here, "j" may be an integer greater than "n". In particular, the processing unit 110 may determine a link, such that a node dropped from the short stack may be re-stored in the short stack by the re-traversal commencing from the intermediate node.

For example, in operation 1040, the processing unit 110 may update a link previously stored when a link stored last fails to indicate a (kn+1)-th node. When compared to the link stored last, the link newly stored by the update may indicate a node having a level greater by "1". In particular, the node indicated by the link may increase by a single level through the update. The update may continue until the link indicates the (kn+1)-th node.

The processing unit 110 may add a new link when the link previously stored indicates the (kn+1)-th node.

In operation 1050, the processing unit 110 may shift the short stack. Through the shifting, a node pushed to the short stack for a first time may be dropped.

Through the shifting, a space for pushing a new node to the short stack may be created. For example, an empty slot for storing a node may be created in the stack area 820.

In operation 1060, the processing unit 110 may push a node to the short stack.

Figure 11:
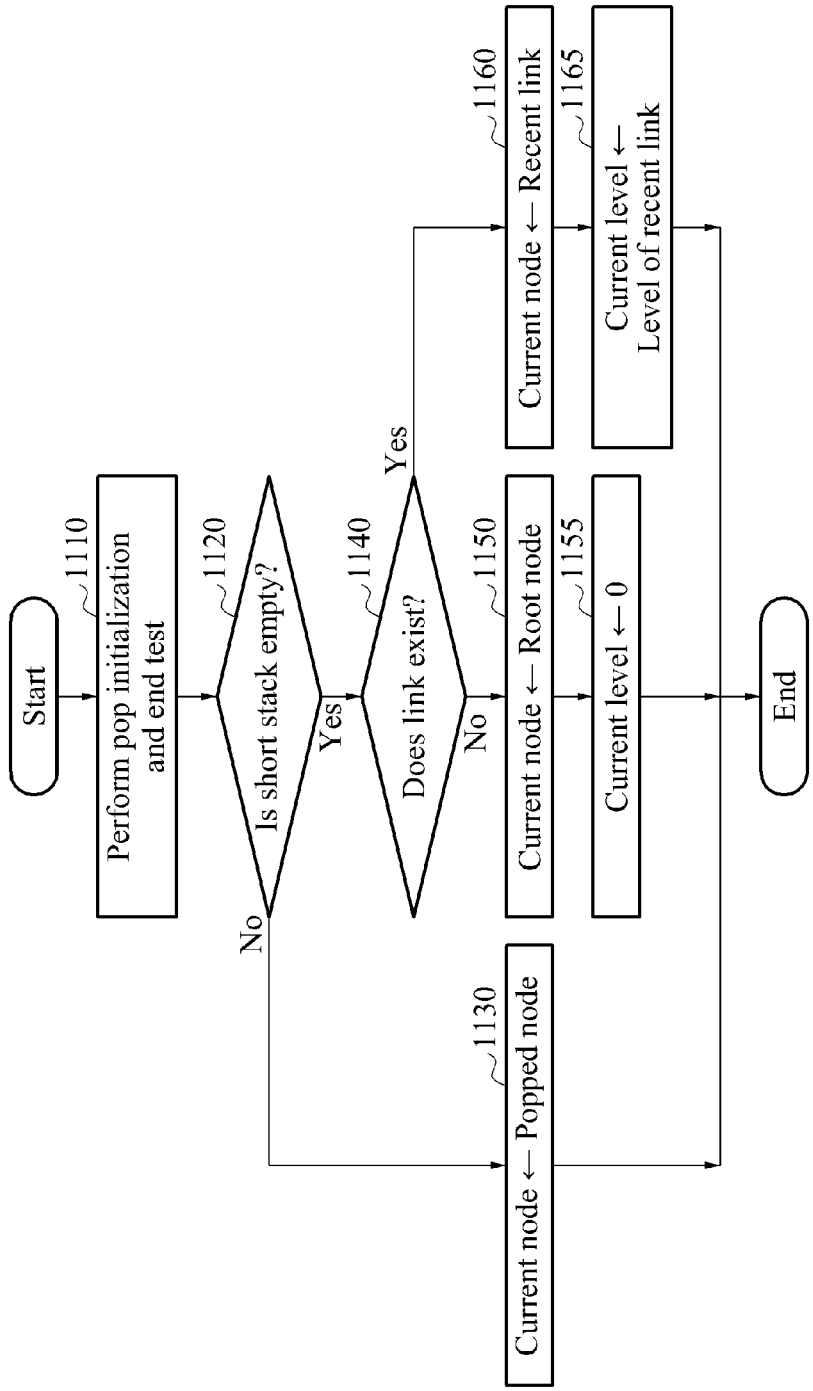
FIG. 11 illustrates popping of a short stack using a link according to example embodiments.

FIG. 11 illustrates popping of a short stack using a link according to example embodiments.

Operations 380 and 396 described above with reference to FIG. 3 may include operations 1110 to 1165.

In operation 1110, the processing unit 110 may perform a pop initialization and an end test. The pop initialization may refer to setting at least one bit value of a restart trail. The end test may refer to determining whether a ray casting is ended. Operation 1110 may correspond to operation 510 described above with reference to FIG. 5. Hereinafter, repeated descriptions may be omitted for conciseness.

In operation 1120, the processing unit 110 may determine whether the short stack is empty.

When the short stack is determined not to be empty, the processing unit 110 may perform operation 1130. The processing unit 110 may perform a process required for a restart by performing operations 1140 and 1165 because a node to be popped is absent when the short stack is determined to be empty.

In operation 1140, the processing unit 110 may determine whether a link stored exists. When the link stored is determined to be absent, a re-traversal from a root node may be performed as described above with reference to FIG. 5. When the link stored is determined to exist, a re-traversal from an intermediate node indicated by the link may be performed. When the link stored is determined to be non-existent, the processing unit 110 may perform operations 1150 and 1155. When the link stored is determined to be absent, the processing unit 110 may perform operations 1160 and 1165.

In operation 1130, the processing unit 110 may pop a node from the short stack. The processing unit 110 may set a current node to be a node popped. In particular, a far child stored in a stack may become a new current node. The restart trail and the current level may match the node popped by the set, respectively, and the TRV may continue.

In operation 1150, the processing unit 110 may set the current node to be the root node.

In operation 1155, the processing unit 110 may set a value of the current level to be zero.

In operation 1160, the processing unit 110 may set the current node to be a node indicated by the link. When the node is plural, the processing unit 110 may set the current node to be a node indicated by a last link from among the plurality of links. Alternatively, the processing unit 110 may set the current node to be a node of a greatest level from among the nodes indicated by the plurality of links.

In operation 1165, the processing unit 110 may set the value of the current level to be a value of a level indicated by the link or a value of a level of a node indicated by the link. When the node is plural, the processing unit 110 may set the value of the current level to be a value of the level indicated by a last link from among the plurality of links. Alternatively, the processing unit 110 may set the value of the current level to be a value of the greatest level from among levels of the nodes indicated by the plurality of links.

Through the aforementioned example embodiments, a performance of a ray tracing, being a vital function of a graphics processing unit (GPU) may be enhanced. A tree TRV using a stack may occupy a large portion in hardware for a ray tracing. Through the aforementioned example embodiments, inefficient use of memory resources and processor resources may be reduced through a re-traversal in the tree TRV. More particularly, an unnecessary overlapping entering with respect to a node may decrease through performing a re-traversal from an intermediate node required for re-filling a short stack.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for managing a stack according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An electronic apparatus, comprising:
   a processor configured to manage a short stack for a tree traversal (TRV); and
   a storage configured to store data of the short stack,
   wherein the processor restarts the tree TRV from an intermediate node disposed between a root node of the tree and a node popped last in the short stack to fill the short stack in response to the short stack being empty, and
   wherein the processor predetermines the intermediate node by storing a link indicating the intermediate node in the storage, and
   wherein the processor manages a buffer of a predetermined size,
   the storage unit stores data of the buffer, and
   the buffer stores the short stack, and stores the link indicating the intermediate node.

2. The electronic apparatus of claim 1, wherein the tree comprises an acceleration structure (AS) in which partitioned spaces overlap.

3. The electronic apparatus of claim 1, wherein the tree comprises a bounding volume hierarchy (BVH).

4. The electronic apparatus of claim 1, wherein the processor stores the link in the storage unit when the short stack is full.

5. The electronic apparatus of claim 1, wherein the link comprises a plurality of links.

6. The electronic apparatus of claim 5, wherein the processor variably adjusts a size of a first area in the buffer storing the short stack and a size of a second area in the buffer storing the plurality of links.

7. The electronic apparatus of claim 1, wherein the processor determines a number of the plurality of links, based on a maximum value of a number of nodes being pushed during the tree TRV.

8. The electronic apparatus of claim 1, wherein the processor determines a number of the plurality of links, based on the maximum value of the number of nodes being pushed during the tree TRV, and a size of the short stack.

9. A method for a tree traversal (TRV), using a short stack, the method comprising:
   popping, by a processor, a node from the short stack;
   restarting, by a processor, the tree TRV to fill the short stack from an intermediate node disposed between a root node and the popped node in response to the tree being empty, wherein the intermediate node is predetermined by a link stored in a storage unit; and
   managing, by a processor, a buffer of a predetermined size, wherein data of the buffer is stored in the storage unit, and the link indicating the short stack and the intermediate node is stored in the buffer.

10. The method of claim 9, wherein the tree comprises an acceleration structure (AS) in which partitioned spaces overlap.

11. The method of claim 9, wherein the link is stored in the storage unit when the short stack is full.

12. The method of claim 9, wherein the link comprises a plurality of links.

13. The method of claim 12, wherein a size of a first area in the buffer storing the short stack and a size of a second area in the buffer storing the plurality of links are variably adjusted.

14. The method of claim 9, wherein a number of the plurality of links is determined based on a maximum value of a number of nodes being pushed during the tree TRV.

15. The method of claim 9, wherein the number of the plurality of links is determined based on the maximum value of the number of nodes being pushed during the tree TRV and a size of the short stack.

16. A non-transitory computer-readable recording medium comprising a program for instructing a computer to perform the method of claim 9.

* * * * *